United States Patent
Blasing et al.

(10) Patent No.: US 10,253,454 B2
(45) Date of Patent: Apr. 9, 2019

(54) METHOD FOR CONTROLLING THE DEPOSITION OF STICKIES IN PULPING AND PAPERMAKING PROCESSES

(71) Applicant: Nopco Paper Technology GmbH, Dusseldorf (DE)

(72) Inventors: Birgit Blasing, Dusseldorf (DE); Siegmund Fridrischak, Dusseldorf (DE); Bernhard Nellessen, Dusseldorf (DE); Achim Schenker, Dusseldorf (DE)

( * ) Notice: Subject to any disclaimer, the term of this patent is extended or adjusted under 35 U.S.C. 154(b) by 0 days.

(21) Appl. No.: 15/519,461

(22) PCT Filed: Oct. 15, 2015

(86) PCT No.: PCT/EP2015/073874
§ 371 (c)(1),
(2) Date: Apr. 14, 2017

(87) PCT Pub. No.: WO2016/059153
PCT Pub. Date: Apr. 21, 2016

(65) Prior Publication Data
US 2017/0335514 A1 Nov. 23, 2017

(30) Foreign Application Priority Data

Oct. 15, 2014 (GB) .................................. 1418288.5

(51) Int. Cl.
| | | |
|---|---|---|
| *D21C 3/00* | (2006.01) | |
| *D21C 5/02* | (2006.01) | |
| *D21C 9/00* | (2006.01) | |
| *D21C 9/08* | (2006.01) | |
| *D21H 17/13* | (2006.01) | |
| *D21H 17/59* | (2006.01) | |

(52) U.S. Cl.
CPC ............. *D21C 9/008* (2013.01); *D21C 3/003* (2013.01); *D21C 5/022* (2013.01); *D21C 9/08* (2013.01); *D21H 17/13* (2013.01); *D21H 17/59* (2013.01); *Y02W 30/648* (2015.05)

(58) Field of Classification Search
CPC ........ D21C 9/008; D21C 5/025; D21H 17/13; D21H 17/59; D21H 21/02; Y10S 162/04
See application file for complete search history.

(56) References Cited

U.S. PATENT DOCUMENTS

| | | | |
|---|---|---|---|
| 9,382,660 B2 * | 7/2016 | Hengesbach | D21C 5/02 |
| 9,567,244 B2 * | 2/2017 | Souda | D21C 9/02 |
| 9,758,588 B2 * | 9/2017 | Berry | C07K 16/2896 |
| 2006/0162888 A1 * | 7/2006 | Sekiya | D21F 1/30 162/199 |
| 2015/0075741 A1 * | 3/2015 | Hengesbach | D21C 5/02 162/198 |
| 2015/0093764 A1 * | 4/2015 | Berry | C07K 16/2896 435/7.21 |
| 2017/0335514 A1 * | 11/2017 | Blasing | D21C 9/008 |

FOREIGN PATENT DOCUMENTS

| | | | | |
|---|---|---|---|---|
| CA | 2964665 A1 * | 4/2016 | | |
| EP | 3207175 B1 * | 6/2018 | | D21C 3/003 |
| WO | 2004011717 | 2/2004 | | |
| WO | WO-2004044322 A1 * | 5/2004 | | C09D 183/04 |
| WO | 2006113896 | 10/2006 | | |
| WO | WO-2013156147 A1 * | 10/2013 | | D21H 21/02 |
| WO | WO-2016059153 A1 * | 4/2016 | | D21C 3/003 |

OTHER PUBLICATIONS

PCT/EP2015/073874—International Preliminary Report on Patentability, dated Jan. 10, 2017.
PCT/EP2015/073874—International Search Report and Written Opinion, dated Mar. 24, 2016.
PCT-EP2015/073874—Written Opinion of the International Preliminary Examining Authority, dated Oct. 12, 2016.

* cited by examiner

*Primary Examiner* — Jose A Fortuna
(74) *Attorney, Agent, or Firm* — Lorenz & Kopf, LLP

(57) ABSTRACT

A method for controlling the deposition of stickies in pulping and papermaking processes comprises adding to fiber pulp or stock an additive comprising an organomodified siloxane.

15 Claims, 4 Drawing Sheets

METHOD FOR CONTROLLING THE DEPOSITION OF STICKIES IN PULPING AND PAPERMAKING PROCESSES

CROSS-REFERENCE TO RELATED APPLICATIONS

This application is a U.S. National-Stage entry under 35 U.S.C. § 371 based on International Application No. PCT/EP2015/073874, filed Oct. 15, 2015, which was published under PCT Article 21(2) and which claims priority to GB Application No. 15805108.6, filed Oct. 15, 2014, which are all hereby incorporated in their entirety by reference.

BACKGROUND

The presently disclosed and/or claimed inventive concept(s) relates to a method for controlling the deposition of stickies in pulping and papermaking processes.

Problems associated with the formation of sticky deposits, comprising both inorganic and organic components, in pulping and papermaking processes are well known. "Pitch", "stickies", and "white-pitch" are commonly used terms for sticky hydrophobic materials produced during these processes, which adhere to surfaces and build up as aggregates in machinery.

In pulping processes using virgin fibres, "pitch" normally refers to natural resin hydrophobic materials, including fatty acids, esters and sterols, derived from the natural raw materials, most often wood. Pitch is especially prevalent in mechanical grades of pulp often used in recycled paper, where it is hydrolytically degraded and saponified to a lesser extent compared to the alkaline kraft process for making chemical pulp.

Paper can also be made from recycled fibres recovered from waste paper. In paper recycling both natural pitch and synthetic materials, such as polymers and binders used in paper, paper coating and printing inks, may form such tacky materials. In recycling industries these synthetic polymers are often referred to as "stickies" or "white pitch".

For brevity, henceforth all of these sticky hydrophobic materials will be referred to collectively as "stickies". Also for brevity, henceforth "papermaking" will be used to refer to both papermaking from virgin fibres and recycled fibres.

Stickies tend to form aggregates and adhere to surfaces in machinery, creating processing problems and degradation of the quality of the end product. Sticky deposits on surfaces, clogging of screens and filters hindering water passage and drainage, and deposits on cylinders and rolls are all frequently experienced and well known problems in this industry. Adhesion of stickies to surfaces reduces the effectiveness and efficiency of the manufacturing process, and results in interruptions and down-time for cleaning machinery, all of which have a negative economic impact. Adhesion of stickies to surfaces can also result in a reduction in product quality.

Various techniques have been published as possible methods for reducing the impact from sticky deposits. However, only few of these techniques have established themselves in common use in full scale manufacturing.

Mechanical devices, such as cyclones, are used in pulp and papermaking processes to separate materials of different gravity. US 2006124256(A1) describes the use of cyclones for the removal of high density stickies, followed by a flotation step. However, this method may require specific system modifications, for removing the currents of specific gravity. In many cases, long chain, hydrophobic organic materials have lower densities relative to the surrounding chemical environment. EP 0869218 describes adding a magnetic material having an affinity for the stickies with the subsequent removal of the aggregates in a magnetic field. However, this method also requires technical installations and a special design set up.

Chemical approaches for controlling stickies are also known, for example through the use of various types of organic polymeric materials having an affinity for stickies. One of the most common approaches is to dose the system with a cationically charged material, due to the overall electronegative character of the stickies. Commonly used materials of this type are condensates of dicyandiamide with formaldehyde and poly-DADMAC. For example, EP1623067 describes the use of a crosslinked poly-DADMAC, while in EP1763609 an amphoteric polymer combined with anionically charged siliceous solid particles is used.

However, charged compounds have the potential to interfere with the chemistry of a papermaking system, and may have a negative impact on the finely tuned charge balance required for paper formation.

EP0569085 describes the use of a modified melamine formaldehyde polymer for this purpose, while EP1165677 describes using a polyphenolic compound modified with an amphoteric constituent. However, the use of bisphenols has toxicological issues. EP2044263 describes use of hydrophobically modified polyethyleneglycol.

In many cases, single polymers have been found to have limited performance, and combinations of polymers have been used instead. For example, EP0693147 and EP0693149 describe the use of native potato starch in combination with carboxyethylcellulose and/or methylhydroxypropylcellulose. EP1627107 describes the use of a cationic polymer combined with a hydrophobic modified hydroxyethyl cellulose, and EP0986670 describes using at least two materials selected from an oil-soluble or water-dispersible polymer, an oil-soluble or water-dispersible surfactant, a tackifier, and an oil-soluble or water-dispersible solvent. EP1425471 describes the use of a copolymer based on 75-95% acrylamide and 5-25% vinylacetate dosed to the pulp furnish. U.S. Pat. No. 5,510,439 describes a method for controlling pitch in papermaking systems through coagulation using a preferred reaction product of a major amount of diallyldimethylammonium chloride (95.0-99.9 parts) with a minor amount of vinyltrimethoxysilane (0.01-5.0 parts). In EP0825293 a combined dosage of a polyvinyl chloride, a cationic polymeric coagulant and a polymeric flocculent is used. CA2219139 describes the use of alkoxylation products (esters) of C10-C22 fatty acids and C10-C22 fatty acids containing an —OH group.

Pigments or adsorbents, such as bentonite, talc and clay having an affinity to stickies thus rendering them less tacky, are also commonly used materials for reducing their adsorption onto surfaces. For example, CN102733259 describes the use of talc, EP0989229 the use of a hydrophobic modified synthetic or natural mineral, U.S. Pat. No. 5,540,814 the use of cationic clay, and U.S. Pat. No. 5,080,759 the use of various organotitanium(IV) compounds. EP0740014 describes the use of siliceous particulate inorganic materials comprising at least one silicon-containing compound coated with a nitrogen-containing material containing one or more triazine rings. The particulate material is an aluminosilicate, such as kandite clay, coated with a homo- or copolymer comprising melamine formaldehyde-type structures. However, such minerals normally need high addition rates, and may lead to dusting of the final paper and/or increased sludge formation in waste water treatment plants because they can be very difficult to retain in the paper.

Stickies are hydrophobic, insoluble in water, and may develop increased tacky/adhesive properties under process conditions in pulp and papermaking. Other types of hydrophobic materials have thus been suggested for such treatment.

For example, WO9605361 describes the use of combinations of hydrocarbon-containing compounds, EP0517360 the use of a hydrocarbon solvent with a blend of surfactants, DE10324369 a fibre suspension cleaned for hydrophobic stickies by adding a triglyceride oil from various natural sources, EP0920551 the use of fatty alcohols for agglomerating stickies to such a size that they can be removed by screening, and EP1950342 a stickies control agent based on a PIT emulsion comprising a) dialkylamides as the main constituent and b) non-ionic surfactants for obtaining the emulsion. PIT refers to "Phase Inversion Temperature", and requires the use of specifically combined surfactants for obtaining a phase inversion at a specific temperature, whereby small particles/droplets are formed. Fatty alcohol ethoxylates/partial glycerides or partial glycerides/alk(en)yl oligoglycosides or fatty acid amide alkoxylates/alk(en)yl oligoglycosides combinations are the preferred surfactants. However, a limitation of using non-ionic surfactants is that they do not prevent the formation of agglomerates of stickies, and their ability to disperse fine particles over a longer time is limited.

Organic surfactants have also been described for the reduction of stickies, often in combination with organic polymers. For example, CN101725064 describes a method of removing stickies through the use of combinations of non-ionic surfactants and anionic dispersing agents, such as (salts of) polyacrylamide, polyacrylic and polymetacrylic polymers. DE19929919 describes the use of non-ionic surfactants for dispersion in the high concentration phase, followed by flotation.

Proteins, including enzymes, have also been described for the reduction of stickies. For example, EP1268932 describes the use of whey proteins in combination with cationic compounds, and US2001020150 also describes the use of whey proteins. EP1802806 describes the use of various enzymes hydrolyzing or modifying the stickies in combination with anionic, non-ionic or cationic synthetic or natural adsorbents, such as silicates, carbonates or combinations thereof. DE102005034413 describes the use of an esterase enzyme (lipase) combined with a non-ionic, non-polymeric surfactant, and CN103074795 similarly describes the use of alkaline lipase for controlling stickies. EP1402109 describes the treatment of pulp from recycled paper with lipolytic enzymes to control stickies, the enzymes able to hydrolyze a polymer comprising vinylacetate monomer at neutral pH. CN101760976 applies an enzyme in combination with a soap deinking agent and a polyether surfactant. EP2092114 describes the use of enzymes in combination with non-ionic detackifiers in the form of hydrophobic modified hydroxyethylcellulose or a polyvinylacetate with a degree of hydrolysis from 50-100%. Proteins may have a pacifying effect on stickies, and enzymes can have a hydrolytic effect on specific chemical bonds. Enzymes are more or less specific in their action on types of chemical sites, and where esterases/lipases/lipolytic enzymes normally have a cleavage effect on ester bonds. However, the performance of enzymes is influenced by the physical/chemical environment, such as pH, temperatures and oxidizing materials. Aldehydes can for example bind to proteins and block the action of enzymes.

In addition to the methods previously cited, other techniques have been published using various types of chemical additives, either neat or in combination. For example, U.S. Pat. No. 5,009,746 describes the use of supercritical $CO_2$ for controlling stickies, EP0698141 water glass in combination with fatty acid soaps and cationic flocculation/retention aids, and EP4923566 dissolved urea. EP1473405 describes how the surface of metallic drying cylinders and/or canvas coated cylinders may be treated by spraying with an amino- or epoxy-functional silicone oil, and related document EP2557226 describes coating drying cylinders in the paper machine (metallic or canvas coated) with an amino-modified polysiloxane.

Measuring the efficacy of the various techniques to control the deposition of stickies can to some extent be done under an artificial environment in the laboratory. However, the results obtained in the laboratory are often not reflected in full-scale industrial processing, where the stickies are influenced by the varying chemical and physical conditions throughout the process chain, where the process runs around the clock, more or less the whole year through.

There will thus always be physical and chemical interactions between the stickies present and the types of surfaces in the machinery where adhesion takes place. Thus, the type of furnish, the system design and processing parameters can each have an impact on the degree of deposition problems experienced. These variations may also limit the types of technology which can be used for combating problems caused by the deposition of stickies.

Only a few of the technologies described have become established as valuable methods for reducing stickies under full scale industrial operations. The industry thus still seeks a simple method for controlling the unwanted deposition of stickies in pulp and paper manufacturing systems, especially in relation to the paper recycling industry where problems from both natural and synthetic stickies occur. The materials used should be compatible with the existing process conditions, and should be able to remove and/or pacify stickies to such an extent that the process can run undisturbed for extended periods. The chosen method should not have a negative impact on the process, and should also be economical to use.

The presently disclosed and/or claimed inventive concept(s) seeks to address these issues with the prior art approaches.

BRIEF DESCRIPTION OF THE SEVERAL VIEWS OF THE DRAWINGS

The presently disclosed and/or claimed inventive concept(s) will now be described in detail by way of example, with reference to the accompanying drawings, in which:

DETAILED DESCRIPTION

Figure 1:
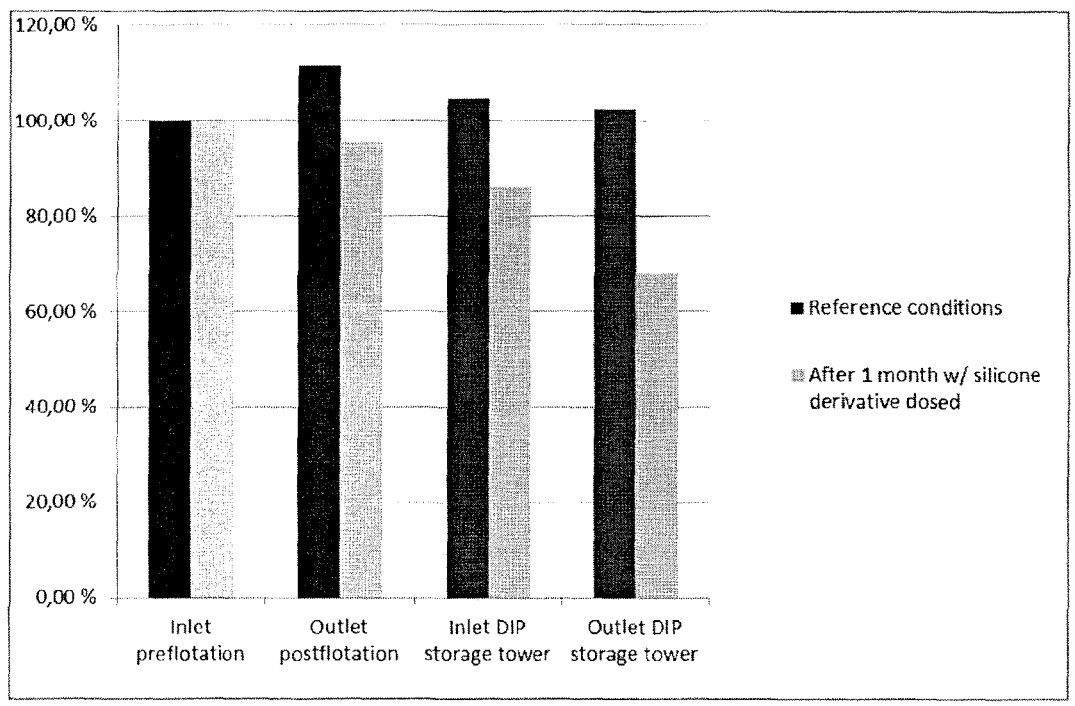
FIG. 1 shows the measured levels of hydrophobic micro-stickies in samples taken from the deinked pulp (DIP) plant of an integrated paper mill, "Mill A"

According to the presently disclosed and/or claimed inventive concept(s) there is thus provided a method for controlling the deposition of stickies in pulping and papermaking processes which comprises adding to fibre pulp or stock an additive comprising an organo-modified siloxane comprising units of the formula:

$$[R^1_a Z_b SiO_{(4-a-b)/2}]_n$$

a) in which each $R^1$ is independently selected from a hydrogen atom, an alkyl, aryl, alkenyl, aralkyl, alkaryl, alkoxy, alkanoyloxy, hydroxyl, ester or ether group;
b) each Z is independently selected from an alkyl group substituted with an amine, amide, carboxyl, ester, or epoxy group, or a group —R2-(OCpH2p)q(OCrH2r)s-R3;
c) n is an integer greater than 1;
d) a and b are independently 0, 1, 2 or 3;
e) $R^2$ is an alkylene group or a direct bond;
f) $R^3$ is a group as defined for $R^1$ or Z above;
g) p and r are independently an integer from 1 to 6;
h) q and s are independently 0 or an integer such that $1 \leq q+s \geq 400$;
i) and wherein each molecule of the organo-modified siloxane contains at least one group Z.

The addition of an additive comprising an organo-modified siloxane to fibre pulp or stock, and in certain non-limiting embodiments, occurs early in the process chain, for example in the stock preparation unit, the pulper outlet, or in paper recycling systems at the pre-flotation inlet. The additive may be added to the pulp or stock either before, during or after fibre disintegration of either virgin or recycled cellulosic material. It has been surprisingly found to effectively control deposits of stickies in a papermaking system, for example on wires, felts, rolls, blades and calenders. It is believed that this is achieved by an increased separation of sticky materials from the fibre pulp or stock, and/or a pacifying effect on sticky materials still present in the fibre current entering the papermaking system.

The additive comprising the organo-modified siloxane may be added to the fibre pulp or stock neat or diluted. It can be easily stored and handled, and has not been found to disturb the charge balance of the wet end of the paper machine. Also, it does not create extra sludge or dusting.

Whilst not wishing to be bound by theory, the effect of the organo-modified siloxane in controlling stickies might be explained through a selective interaction with the hydrophobic stickies, whereby an increased separation may be achieved from the fibre pulp or stock, for example in the flotation unit of a paper recycling plant.

In addition, the organo-modified siloxane might also have a pacifying effect on stickies, whereby the tackiness of the stickies is reduced, so stickies which are not removed from the fibre stream, for example in a flotation unit, have a reduced tendency to adhere to surfaces. Some non-harmful colloidal adhesion to the fibres may also occur, such that the stickies following the flow of fibres to the paper machine become stabilised in a finely dispersed manner.

In certain non-limiting embodiments, the organo-modified siloxane used in the presently disclosed and/or claimed inventive concept(s), Z is a group —$R^2$—$(OC_pH_{2p})_q(OC_rH_{2r})_s$—$R^3$, such as (but not limited to) wherein p and/or r are independently 2, 3 or 4. In certain non-limiting embodiments, q and s are each independently from 5 to 30, such as (but not limited to) from 10 to 25. In a particular (but non-limiting) embodiment of group Z, p is 2, r is 3, and q and s are each independently 15 to 20. In certain non-limiting embodiments, $R^2$ is a direct bond, methylene, ethylene, propylene, butylene, pentylene or hexylene group. In certain non-limiting embodiments, $R^3$ is a hydrogen atom, or a hydroxyl, alkoxy, ester or ether group.

Additionally or alternatively, Z may be an alkyl group substituted with an amine, amide, carboxyl, ester, or epoxy group, for example an alkyl group having from 1 to 6 carbon atoms, i.e. a substituted methyl, ethyl, propyl, butyl, pentyl or hexyl group.

The organo-modified siloxane may be linear or may comprise units in which a+b=0 or 1, i.e. the siloxane may contain branching. In certain non-limiting embodiments, when Z is a group —$R^2$—$(OC_pH_{2p})_q(OC_rH_{2r})_s$—$R^3$, $R^3$ is a hydroxyl, alkoxy or alkanoyloxy group.

In certain non-limiting embodiments, 2 to 20 mole percent of silicon atoms in the siloxane molecule are substituted by a group Z, such as (but not-limited to) 5 to 18 mole percent.

In certain non-limiting embodiments, the molecular weight of the siloxane is 1,000-500,000, such as (but not limited to) 8,000-100,000.

In particular (but non-limiting) embodiments, the organo-modified siloxanes for use in the method of the presently disclosed and/or claimed inventive concept(s) are hydroxyl- or alkyl-endcapped linear polydimethylsiloxanes, in which 5 to 18 mole percent of silicon atoms are substituted by Z groups of the formula —$R^2$—$(OC_pH_{2p})_q(OC_rH_{2r})_s$—$R^3$, in which p is 2, r is 3 and q and s are independently 15 to 20, $R^2$ is an alkylene group having from 1 to 6 carbon atoms or a direct bond, and $R^3$ is a hydrogen atom or a hydroxyl, alkoxy, ester or ether group. In particular (but non-limiting) embodiments, 11 mole percent of silicon atoms are substituted with said Z groups, q and s are both 18, and the organo-modified siloxane has a molecular weight of approximately 60,000.

The additive for use in the method of the presently disclosed and/or claimed inventive concept(s) may consist of organo-modified siloxane alone to control the deposition of stickies, or may comprise the organo-modified siloxane together with one or more components selected from a polydimethylsiloxane, an organic polyether or a fatty acid ester thereof, a fatty acid ester with $C_{1-4}$ mono or polyvalent alcohol or an unsaturated or saturated fatty acid of natural origin or a soap thereof. For example, suitable fatty acids include saturated and unsaturated monobasic aliphatic carboxylic acids, for example having from 8 to 22 carbon atoms, such as lauric, myristic, palmitic, stearic, arachidic, behenic, lignoceric, palmitolic, oleic, linoleic, linolenic, and arachidonic acids.

Suitable organic polyethers for use with the organo-modified siloxane in the method of the presently disclosed and/or claimed inventive concept(s) include those of the formula $R^4$—$(OC_pH_{2p})_q(OC_rH_{2r})_s$—$R^5$ in which $R^4$ and $R^5$ are independently selected from a hydrogen atom, hydroxyl, alkyl, alkoxy or ester groups, p and r are independently an integer from 1 to 6, and q and s are independently 0 or an integer such that $1 \leq q+s \geq 400$.

The additive may be in the form of a solution, microemulsion, emulsion, dispersion or any combination thereof. The additive may comprise a water soluble and/or emulsifying siloxane.

The amount of additive to be used can be very low, and hence can be very economical, whereby the cost of the additive is outweighed by the benefits achieved. Thus, in certain non-limiting embodiments, the additive is added in an amount of less than 0.01 weight % of fibre in the pulp as dry material, such as (but not limited to) in an amount of less than 0.005 weight %, for example 0.003-0.004 weight %. For example, a particular (but non-limiting) example of an amount of organo-modified siloxane to be added is 30-40 g/tonne of paper.

In paper recycling processes, the additive used in the presently disclosed and/or claimed inventive concept(s) may be used in addition to standard deinking chemicals, for example for use in flotation deinking processes. Such standard deinking chemicals may include, for example, alkalis (such as alkali metal hydroxides, e.g. sodium hydroxide), waterglass (e.g. sodium silicate), and $H_2O_2$ (peroxide). A fatty acid, or an alkali or alkaline earth metal soap of a fatty acids (suitable fatty acids include those referred to hereinabove) may be used in pre- and post-flotation stages, for example sodium soap of fatty acids (which can convert to calcium soap in hard water).

The detection and measurement of stickies particles in a pulping or papermaking system may be performed through flow cytometry, or another optical method, and sticky deposits may be controlled by visual inspections and/or gravimetric measurements.

Example 1—"Mill A"

Mill A is an integrated paper mill using recycled paper grades as furnish for producing printing grades of paper.

An ordinary two loop RCF (recycled fibres) unit is used to produce deinked pulp (DIP) for newsprint.

The raw material contained standard household quality ONP and OMG (old news print and magazine grades respectively). The process temperature was between 40 and 50° C., water hardness between 10 and 30° dH and pH between 7 and 9.

A standard chemical mix containing NaOH (caustic soda), waterglass (silicate) and $H_2O_2$ (peroxide) was used in the DIP plant for ink detachment, and prevention of ink redepositioning and yellowing. In addition, a sodium soap was added for ink removal in the pre- and post-flotation loop. The soap was at least partly converted into calcium soap due to the water hardness. The soap was dosed in an amount of 2-3 kg/tonne (calculated as fatty acid per tonne of dry outlet from the pulper/drum).

The amount of hydrophobic "micro-stickies" (<50 µm) was measured in the RCF plant by flow cytometry. The flow cytometry equipment counts the number of hydrophobic "micro-stickies", i.e. particles having the potential to aggregate into larger stickies thus building up tacky deposits on surfaces in the process system. In flow cytometry the degree of deflection of laser beams combined with dyes having an affinity to the particles of concern are used for the detection of particles, with computer processing of the signals. The sample volume for measurements was 0.2 ml.

The degree of build-up of deposits of stickies was also observed from the doctor blade of the drying cylinder number 3 of the paper machine.

An organo-modified siloxane was added to the outlet of the pulper in an amount of 40 g/tonne of incoming paper (0.004 wt %). In particular (but non-limiting) embodiments, the organo-modified siloxane was a polydimethylsiloxane in which 11 mole percent of silicon atoms are substituted by Z groups of the formula $-R^2-(OC_pH_{2p})_q(OC_rH_{2r})_s-R^3$, in which p is 2, r is 3 and q and s are each 18, $R^2$ is a direct bond, and $R^3$ is a hydroxyl group, or another end-capping group, having a molecular weight of approximately 60,000.

During the dosage period of the organo-modified siloxane, depositions of stickies in the paper machine system were significantly reduced. When the organo-modified siloxane stopped being added to the pulper outlet the deposits of stickies in system once again increased. When the organo-modified siloxane was once again added to the pulper outlet, the level of deposits of stickies in the system once again reduced.

FIG. 1 shows the measured levels of hydrophobic micro-stickies through the DIP plant. The level of micro-stickies at the inlet to pre-flotation is defined as 100%, and the levels in the other positions are calculated relative to this level.

FIG. 1 shows that without the addition of the organo-modified siloxane, (i.e. just the standard deinking chemicals and sodium soap) no reduction in micro-stickies was seen between the pre-flotation inlet and the outlet of the DIP storage tower. However, when the organo-modified siloxane was added in an amount of 40 g/tonne of incoming paper accept (0.004 wt %), a significant reduction in the level of micro-stickies was found in samples taken from the same positions. Thus, the measured level of micro-stickies reduced from 100% at the pre-flotation inlet to 68% in the DIP storage tower outlet.

Figure 2:
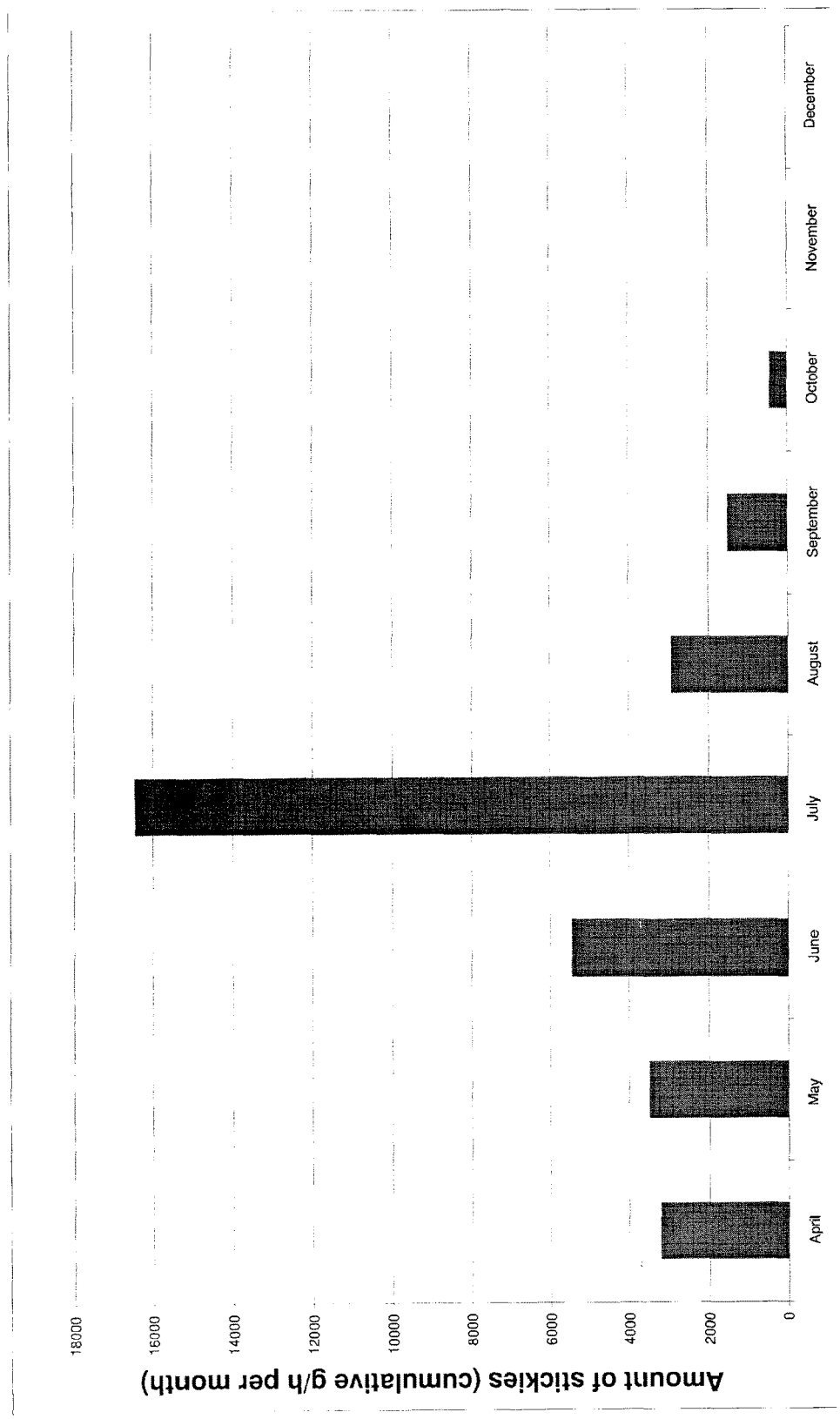
FIG. 2 shows a graph of the cumulative build-up per month of hydrophobic micro-stickies on the doctor blade on drying cylinder number 3 of the paper machine Mill A over a period of months, both before and after the addition of an organo-modified siloxane.

FIG. 2 shows a graph of the cumulative average build-up (g/h) per month of hydrophobic micro-stickies on the doctor blade on drying cylinder number 3 of the paper machine Mill A over a period of months, both before and after the addition of an organo-modified siloxane (March through December). Thus, the average build-up of micro-stickies (g/h) was measured each day, from which a cumulative average amount for each month was calculated.

The graph shows that the stickies deposits peaked in July (approximately 16500 g/h per month cumulative) prior to introduction of the organo-modified siloxane additive in the second half of this month. After this, the build-up of stickies lowered significantly, to approximately 3000 g/h in August, 1500 g/h in September, 425 g/h in October, and negligible amounts in November and December.

Example 2—"Mill B"

Mill B is a two loop RCF unit used to produce DIP for newsprint production. The raw material compositions comprise standard household quality ONP and OMG.

The same chemical mix containing caustic, silicate and peroxide was again used for ink detachment, and prevention of ink redepositioning and yellowing.

Again, in addition to this chemical mix, sodium soap, transformed into calcium soap due to the water hardness, was added for ink removal in the pre- and post-flotation loops.

The process temperature was between 45 and 50° C., the water hardness level between 10 and 30°dH and the pH between 7 and 9.

The potential for the formation of deposits of stickies on surfaces in the process system was assessed by investigating the amount of hydrophobic micro-stickies present in the RCF plant, and in positions in the wet end of the paper machine, performed by flow cytometry.

In a reference period, 1.5 kg of sodium soap/tonne (as fatty acids) was dosed to the RCF plant, in addition to the other chemicals used for the DIP manufacturing.

In a test period a combined dosage of 1 kg of sodium soap/tonne and 36 g organo-modified siloxane/tonne of incoming dry accept were dosed (0.0036 wt %), in addition to the standard deinking chemicals.

Figure 3:
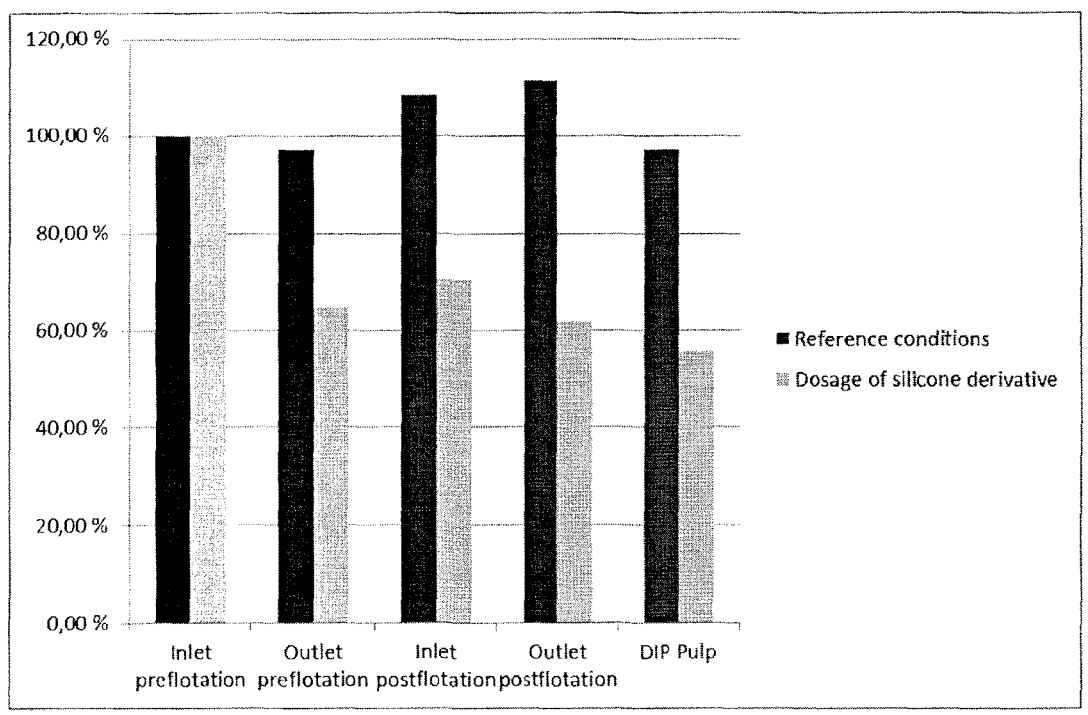
FIG. 3 shows the measured levels of hydrophobic micro-stickies in samples taken from the DIP plant of an integrated paper mill "Mill B"

FIG. 3 shows the levels of hydrophobic micro-stickies in samples taken from the DIP plant in Mill B relative to the level at the pre-flotation inlet, as measured by flow cytometry. Again, the level of hydrophobic micro-stickies at the pre-flotation inlet is defined as 100%.

When dosing with standard chemicals only, including 1.5 kg sodium soap/tonne, there is no significant reduction of the levels of hydrophobic micro-stickies observed through the deinking system.

When dosing the organo-modified siloxane to the accept after the drum pulper in an amount of 36 g/tonne (0.0036 wt %), in combination with a reduced amount of sodium-soap (I kg/tonne), a significant reduction in the level of hydrophobic micro-stickies was measured.

Figure 4:
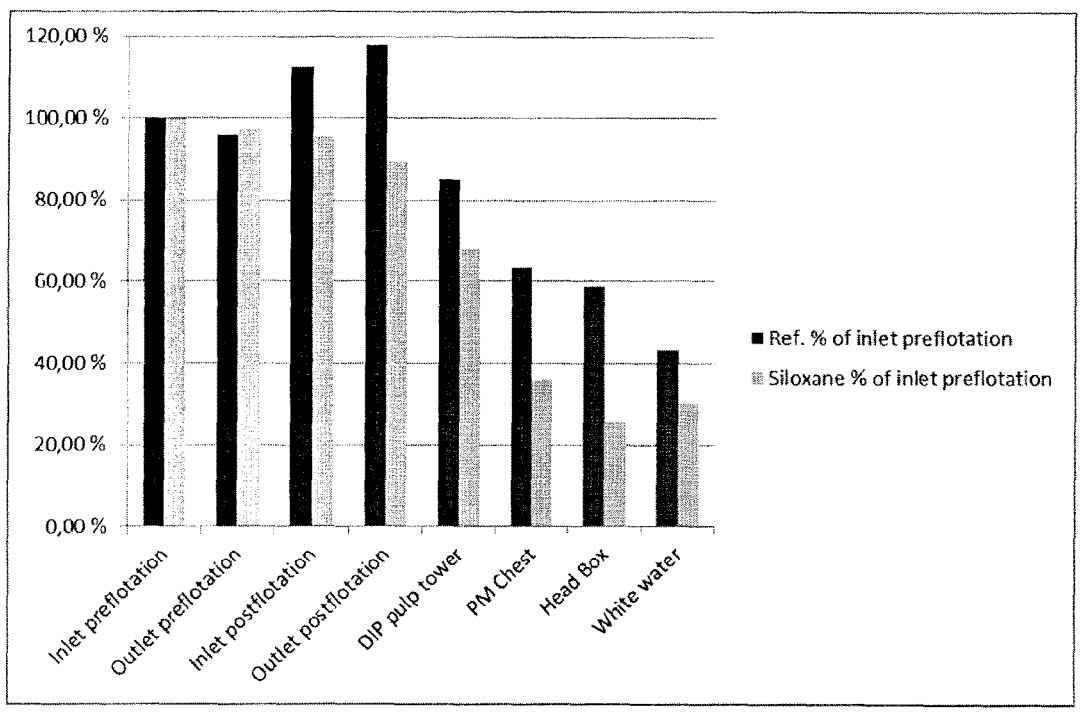
FIG. 4 shows the average change in the level of hydrophobic micro-stickies at different positions relative to the level at pre-flotation inlet of the DIP plant in Mill B.

FIG. 4 shows the average change in level of hydrophobic micro-stickies at different positions relative to the level at pre-flotation inlet of the DIP plant in Mill B, during the reference period (4 runs over 3 months) and during the test period with a dosage of organo-modified siloxane to the RCF plant (8 runs over 11 months), measured by flow cytometry.

FIG. 4 shows that the amount of hydrophobic micro-stickies is in most positions reduced during the test period using the organo-modified siloxane compared to the reference period.

The invention claimed is:

1. A method for controlling the deposition of stickies in pulping and papermaking processes which comprises adding to fibre pulp or stock an additive comprising an organo-modified siloxane comprising units of the formula:

$$[R^1_a Z_b SiO_{(4-a-b)/2}]_n$$

in which each $R^1$ is independently selected from a hydrogen atom, an alkyl, aryl, alkenyl, aralkyl, alkaryl, alkoxy, alkanoyloxy, hydroxyl, ester or ether group;
each Z is independently selected from an alkyl group substituted with an amine, amide, carboxyl, ester, or epoxy group, or a group $-R^2-(OC_pH_{2p})_q(OC_rH_{2r})_s-R^3$;
n is an integer greater than 1;
a and b are independently 0, 1, 2 or 3;
$R^2$ is a direct bond, methylene, ethylene, propylene, butylene, pentylene or hexylene group;
$R^3$ is a hydrogen atom, alkyl, hydroxyl, alkoxy, ester or ether group;
p and r are independently 2, 3 or 4;
one of q and s is 0 or q+s is an integer such that $1 \leq q+s \leq 400$;
wherein each molecule of the organo-modified siloxane contains at least one or more Z groups $-R^2-(OC_pH_{2p})_q(OC_rH_{2r})_s-R^3$; and
wherein the additive is added in a stock preparation unit, a pulper outlet, to the fibre pulp or stock, or combinations thereof, either before, during or after fibre disintegration of either virgin or recycled cellulosic material.

2. The method according to claim 1, wherein q and s are each independently from 5 to 30.

3. The method according to claim 2, wherein q and s are each independently from 10 to 25.

4. The method according to claim 1, wherein at least one or more Z groups are an alkyl group substituted with an amine, amide, carboxyl, ester, or epoxy group, and/or wherein at least one or more Z groups are an alkyl group having from 1 to 6 carbon atoms selected from the group consisting of a substituted methyl, ethyl, propyl, butyl, pentyl and hexyl group.

5. The method according to claim 1, wherein 2 to 20 mole percent of silicon atoms in the siloxane molecule are substituted by a group Z.

6. The method according to claim 5, wherein 5 to 18 mole percent of silicon atoms in the siloxane molecule are substituted by a group Z.

7. The method according to claim 1, wherein the molecular weight of the siloxane is 1,000-500,000.

8. The method according to claim 1, wherein the organo-modified siloxane is a hydroxyl- or alkyl-endcapped linear polydimethylsiloxane, in which 5 to 18 mole percent of silicon atoms are substituted by Z groups of the formula $-R^2-(OC_pH_{2p})_q(OC_rH_{2r})_s-R^3$, in which p is 2, r is 3 and q and s are independently 10 to 20.

9. The method according to claim 8, wherein 11 mole percent of silicon atoms are substituted with said Z groups, q and s are both 18, and the organo-modified siloxane has a molecular weight of about 60,000.

10. The method according to claim 1, wherein the additive comprises the organo-modified siloxane together with one or more components selected from a polydimethylsiloxane, an organic polyether or a fatty acid ester thereof, a fatty acid ester with $C_{1-4}$ mono or polyvalent alcohol or an unsaturated or saturated fatty acid of natural origin or a soap thereof.

11. The method according to claim 10, wherein the one or more components comprises an organic polyether having the formula $R^4-(OC_pH_{2p})_q(OC_rH_{2r})_s-R^5$ in which $R^4$ and $R^5$ are independently selected from a hydrogen atom, hydroxyl, alkyl, alkoxy or ester groups, p and r are independently an integer from 1 to 6, and q and s are independently 0 or an integer such that $1 \leq q+s \leq 400$.

12. The method according to claim 1, wherein the additive is in the form of a solution, micro-emulsion, emulsion, dispersion or any combination thereof, and/or comprises a water soluble and/or emulsifying siloxane.

13. The method according to claim 1, wherein the additive is added in an amount of less than 0.01 weight % of fibre in the pulp as dry material.

14. The method according to claim 1, wherein the stickies are detected and measured using flow cytometry.

15. The method according to claim 1, wherein q and s are each independently from 15 to 20, and p is 2, and r is 3.

* * * * *